United States Patent [19]
Lee et al.

[11] Patent Number: 6,141,775
[45] Date of Patent: Oct. 31, 2000

[54] STATUS INFORMATION COLLECTION/ CONTROL ARRANGEMENT FOR COMMUNICATION SYSTEM

[75] Inventors: Ho-Seob Lee; Sung-Jin Bae, both of Seoul, Rep. of Korea

[73] Assignee: SamSung Electronics Co., Ltd., Suwon, Rep. of Korea

[21] Appl. No.: 09/162,121

[22] Filed: Sep. 29, 1998

[30] Foreign Application Priority Data

Sep. 29, 1997 [KR] Rep. of Korea ...................... 97-49566

[51] Int. Cl.⁷ .................................................. G06F 11/00
[52] U.S. Cl. .............................. 714/30; 714/718; 714/725
[58] Field of Search .................... 710/15–19; 714/25–57, 714/718–738

[56] References Cited

U.S. PATENT DOCUMENTS

| | | | |
|---|---|---|---|
| 5,005,172 | 4/1991 | Kawamoto | 714/31 |
| 5,143,274 | 9/1992 | Laupretre et al. | 228/102 |
| 5,163,052 | 11/1992 | Evans et al. | 714/31 |
| 5,233,612 | 8/1993 | Huyskens et al. | 714/30 |
| 5,423,050 | 6/1995 | Taylor et al. | 714/31 |
| 5,432,464 | 7/1995 | Darnault | 326/37 |
| 5,479,649 | 12/1995 | Runaldue et al. | 714/724 |
| 5,566,186 | 10/1996 | Paterson et al. | 714/736 |
| 5,600,788 | 2/1997 | Lofgren et al. | 714/31 |
| 5,615,335 | 3/1997 | Onffroy et al. | 714/30 |
| 5,629,876 | 5/1997 | Huang et al. | 395/500.41 |
| 5,640,337 | 6/1997 | Huang et al. | 395/500.44 |
| 5,648,973 | 7/1997 | Mote, Jr. | 714/718 |
| 5,649,094 | 7/1997 | Hayashi et al. | 714/30 |
| 5,710,934 | 1/1998 | Bona et al. | 714/724 |
| 5,748,644 | 5/1998 | Szabo | 714/733 |
| 5,754,759 | 5/1998 | Clarke et al. | 714/37 |
| 5,764,952 | 6/1998 | Hill | 716/4 |
| 5,774,708 | 6/1998 | Klinger | 712/227 |
| 5,802,270 | 9/1998 | Ko et al. | 714/27 |
| 5,936,953 | 8/1999 | Simmons | 370/364 |
| 5,938,779 | 8/1999 | Preston | 714/718 |

FOREIGN PATENT DOCUMENTS

98/02822  1/1998  WIPO.

*Primary Examiner*—Christopher B. Shin
*Attorney, Agent, or Firm*—Robert E. Bushnell, Esq.

[57] ABSTRACT

A status information collection/control arrangement for a communication system has an operation processing unit including a plurality of ASICs and a monitoring control unit for monitoring and controlling the operation processing unit. Each of the ASICs generates status information and process control information from the monitoring control unit regarding the status information. The arrangement includes a dedicated interface ASIC for performing data communication with the monitoring control unit via a bidirectional data bus and processing an interface operation between the ASICs and the monitoring control unit in response to a unit select signal, address, read enable signal and write enable signal from the monitoring control unit.

16 Claims, 4 Drawing Sheets

STATUS INFORMATION COLLECTION/CONTROL ARRANGEMENT FOR COMMUNICATION SYSTEM

This application makes reference to, incorporates the same herein, and claims all benefits accruing under 35 U.S.C. §119 from an application for STATUS INFORMATION COLLECTION/CONTROL APPARATUS FOR COMMUNICATION SYSTEM earlier filed in the Korean Industrial Property Office on Sep. 29, 1997 and there duly assigned Serial No. 49566/1997.

BACKGROUND OF THE INVENTION

1. Field of the Invention

The present invention relates to a technique for collecting and controlling status information between a plurality of application specific integrated circuits (referred to hereinafter as ASICs) and a monitoring control unit in a communication system.

2. Description of the Related Art

In communication systems, a monitoring control unit with a microprocessor therein is adapted to collect status information from a plurality of units in a pin-to-pin manner, analyze the collected status information and perform desired control operations in accordance with the analyzed results. With semiconductor techniques being developed, ASICs have greatly been enhanced in integration degree and, in most communication systems, one or more ASICs have been employed. These make the size of systems smaller and allows only one unit to implement functions which would conventionally be implemented by many units. As a result, the limited pin-to-pin connection results in a problem in that it cannot accommodate a large amount of status information detected in the units. In order to overcome this problem, each ASIC is designed to have a central processing unit (referred to hereinafter as a CPU) interface circuit so that it can be regarded as a part of devices such as a RAM, ROM, etc. contained in the monitoring control unit.

In a status information collection/control apparatus, L ASICs of the same or different types may be contained in an arbitrary operation processing unit.

Each ASIC sends a plurality of (for example, N) status information units Sta 1–Sta N to a CPU (not shown) and receives N control information units Con 1–Con N from the CPU. The status information units Sta 1–Sta N are the results (for example, transmission line abnormal) obtained by checking specific statuses of the corresponding ASIC. The control information units Con 1–Con N are the control contents of the CPU regarding the status information units Sta 1–Sta N. Although not shown, each of the ASICs may be connected to other internal circuits or other external boards (or units). A select signal generator 50 receives a unit select signal SEL which is generated by the CPU to select a specific unit (or chip) and an address ADD, and generates ASIC select signals CS 1–CS L of desired states to select the corresponding chips, or ASICs. The address ADD is generated by the CPU to address a memory included in a CPU interface circuit in the ASIC. In addition, a write enable signal WE is applied to the ASICs to write control data into the memory in the CPU interface circuit in the ASIC. A read enable signal RE is applied to the ASICs to read status information from the memory in the CPU interface circuit in each ASIC. A data bus DB is a bidirectional data communication path between the CPU and the ASICs, for transferring the status information from the ASICs to the CPU and the control information from the CPU to the ASICs.

However, the above-mentioned status information collection/control apparatus has four problems as follows.

Firstly, the CPU interface circuit is very complex in construction because it includes a decoding circuit, multiplexing circuit, latch circuit and various combination logic circuits. Also, with unused memory area becoming larger, more unnecessary gates are used. In other words, if such complex circuits are contained in the respective ASICs and such ASICs are large in number, the use of unnecessary gates will be increased.

Secondly, the CPU interface circuit requires a large number of internal patterns (for example, pin arrangements). In the case where each ASIC is designed with a field programmable gate array (FPGA), the larger number of signal patterns makes the routing of the FPGA more difficult, resulting in a degradation in performance of the ASIC.

Thirdly, all of the ASICs must have address buses of the same size and data buses of the same size regardless of the number of their status information units. If status and control information units to be processed in each ASIC are smaller in number, namely, if N is smaller, unnecessary pins in each ASIC will become larger in number. The larger number of unnecessary pins increases the cost of each ASIC.

Fourthly, the processor must read or control all ASICs contained in one unit in response to one unit select signal SEL. Namely, the ASIC select signals CS 1–CS L are produced by combining the unit select signal SEL with a signal obtained by decoding a portion of high-order bits of the address. This requires a separate circuit. If this separate circuit is designed with a common logic IC, it will occupy a large amount of space in the unit and reduce the reliability of the unit.

The following patents each discloses features in common with the present invention but do not teach or suggest the specifically recited status information collection/control arrangement for a communication system of the present invention: U.S. Pat. No. 5,233,612 to Huyskens et al., entitled Test Device for An Electronic Chip, U.S. Pat. No. 5,163,052 to Evans et al., entitled High Reliability Computer Diagnostics System, U.S. Pat. No. 5,432,464 to Damault, entitled Application Specific Integrated Circuit Including A Microprocessor For Customized Functions As Defined By The User, U.S. Pat. No. 5,615,335 to Onffroy et al., entitled Storage System Self-Test Apparatus And Method, U.S. Pat. No. 5,710,934 to Bona et al., entitled Methods And Test Platforms For Developing AN Application-Specific Integrated Circuit, U.S. Pat. No. 5,802,270 to Ko et al., entitled Integrated Circuit Having AN Embedded Digital Signal Processor And Externally Testable Signal Paths, U.S. Pat. No. 5,774,708 to Klingler, entitled Method To Test The Running Of A Program Of Instructions Carried Out By An ASIC And ASIC Pertaining Thereto, U.S. Pat. No. 5,764,952 to Hill, entitled Diagnostic System Including A LSI Or VLSI Integrated Circuit With A Diagnostic Data Port, U.S. Pat. No. 5,423,050 to Taylor et al., entitled Intermodule Test Across System Bus Utilizing Serial Test Bus, U.S. Pat. No. 5,005,172 to Kawamoto, entitled Diagnostic System In A Data Processing System, U.S. Pat. No. 5,754,759 to Clarke et al., entitled Testing And Monitoring Of Programmed Devices, U.S. Pat. No. 5,649,094 to Hayashi et al., entitled Self-Service Diagnostic Unit For Plural Functional Devices, U.S. Pat. No. 5,600,788 to Lofgren et al., entitled Digital Test And Maintenance Architecture, and U.S. Pat. No. 5,479,649 to Runaldue et al., entitled Method And Apparatus For Forming A logical Combination Of Signals From Diagnostic Nodes In AN IC Chip For Passive Observation At A Dedicated Diagnostic Pin.

SUMMARY OF THE INVENTION

Therefore, the present invention has been made in view of the above problems, and it is an object of the present invention to provide a status information collection/control apparatus which is capable of reducing the total gate and space consumption of a unit, making the routing of a main function ASIC easy and realizing low-cost and high-performance of the ASIC.

In accordance with the present invention, the above and other objects can be accomplished by a provision of a status information collection/control apparatus for a communication system which has an operation processing unit including a plurality of ASICs and a monitoring control unit for monitoring and controlling the operation processing unit, the apparatus comprising the ASICs each adapted to generate status information and process control information from the monitoring control unit regarding the status information; and an interface dedicated ASIC for performing data communication with the monitoring control unit via a bidirectional data bus and processing an interface operation between the ASICs and the monitoring control unit in response to a unit select signal, address, read enable signal and write enable signal from the monitoring control unit.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
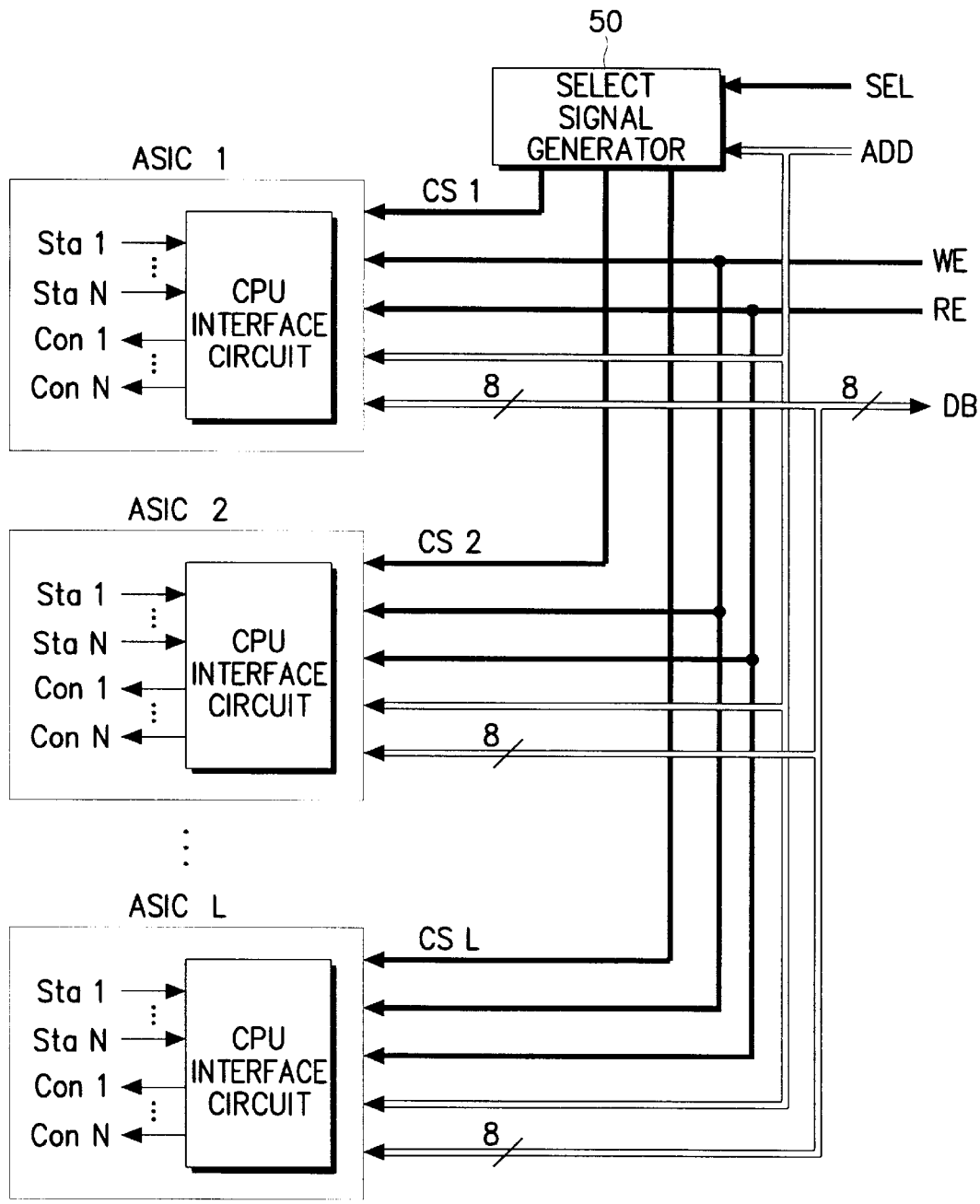
FIG. 1 is a block diagram showing the construction of a status information collection/control apparatus.

In the drawings, the same or similar elements are denoted by the same reference numerals even though they are depicted in different drawings. In the following description made in conjunction with preferred embodiments of the present invention, a variety of specific elements, such is as elements of concrete circuits, are shown. The description of such elements has been made only for a better understanding of the present invention. Those skilled in the art will appreciate that the present invention can be implemented without using the above-mentioned specific elements. In the following description of the present invention, a detailed description of known functions and configurations incorporated herein have been omitted when it may obscure the subject matter of the present invention.

FIG. 1 is a block diagram illustrating the status information collection/control apparatus discussed in the Description of the Related Art above. ASICs 1–L, each including a CPU interface circuit, are connected via several buses to a select signal generator 50.

Figure 2:
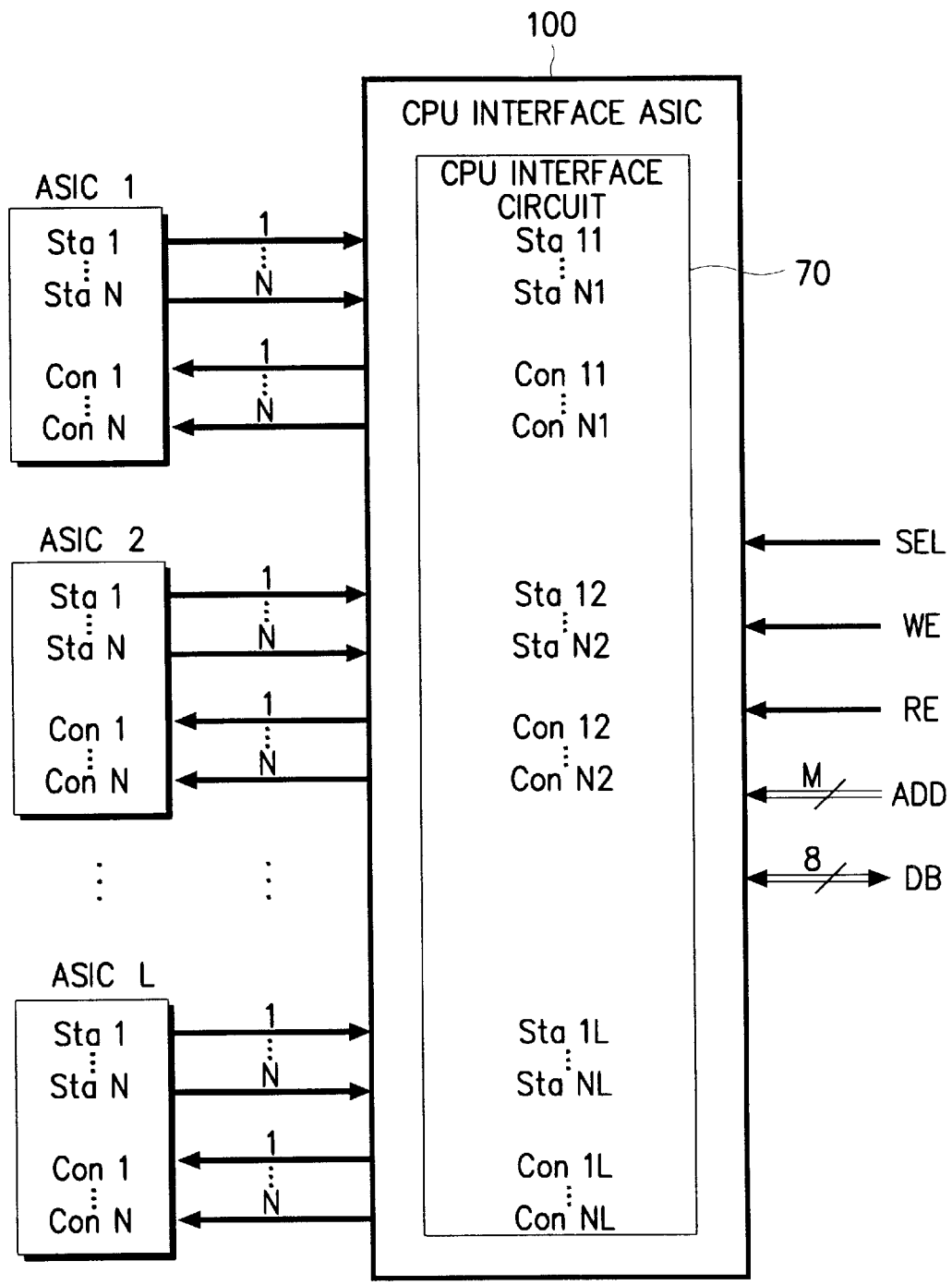
FIG. 2 is a block diagram showing the construction of a status information collection/control apparatus in accordance with an embodiment of the present invention.

FIG. 2 is a block diagram showing the construction of a status information collection/control apparatus in accordance with an embodiment of the present invention. In this drawing, L ASICs of the same or different types may be contained in one operation processing unit.

Each of the ASICs sends a plurality of (for example, N) status information units Sta 1–Sta N to a CPU (not shown), included in a monitoring control unit, and receives N control information units Con 1–Con N from the CPU. The status information units Sta 1–Sta N are the results (for example, transmission line abnormal) obtained by checking specific statuses of the corresponding ASIC. The control information units Con 1–Con N are the control contents of the CPU regarding the status information units Sta 1–Sta N. Although not shown, each of the ASICs may be connected to other internal circuits or other external boards (or units). A CPU interface ASIC 100 is a separate ASIC for handling only a CPU interface function. The CPU interface ASIC 100 includes a CPU interface circuit 70 therein. The status information from the main function ASICs are transferred to the CPU interface ASIC 100.

The CPU interface ASIC 100 is supplied with the following signals. A unit select signal SEL is generated by the CPU to select a specific unit (or chip). An address ADD is generated by the CPU to address a memory included in the CPU interface circuit 70 in the ASIC 100. A write enable signal WE is supplied to write control data into the memory in the CPU interface circuit 70 in the ASIC 100. A read enable signal RE is supplied to read status information from the memory in the CPU interface circuit 70 in the ASIC 100. A data bus DB is a bidirectional data communication path between the CPU and the ASIC, for transferring the status information from the ASIC to the CPU and the control information from the CPU to the ASIC.

First, a status information collection operation will hereinafter be described.

The N status information from each of the ASICs are all connected to the CPU interface ASIC 100. In result, the total number of the collected status information is N×L. Then, the CPU interface ASIC 100 multiplexes the status information in response to the address ADD from the monitoring control unit and sends the multiplexed result to the monitoring control unit via the data bus DB in response to the unit select signal SEL and read enable signal RE.

Next, a control operation by the monitoring control unit will hereinafter be described.

The control information from the monitoring control unit are transferred to the CPU interface ASIC 100 via the bidirectional data bus. The CPU interface ASIC 100 separates and stores the transferred control information in response to the address ADD, unit select signal SEL and write enable signal WE. Then, the stored unit control information are separately sent to the ASICs.

Figure 3:
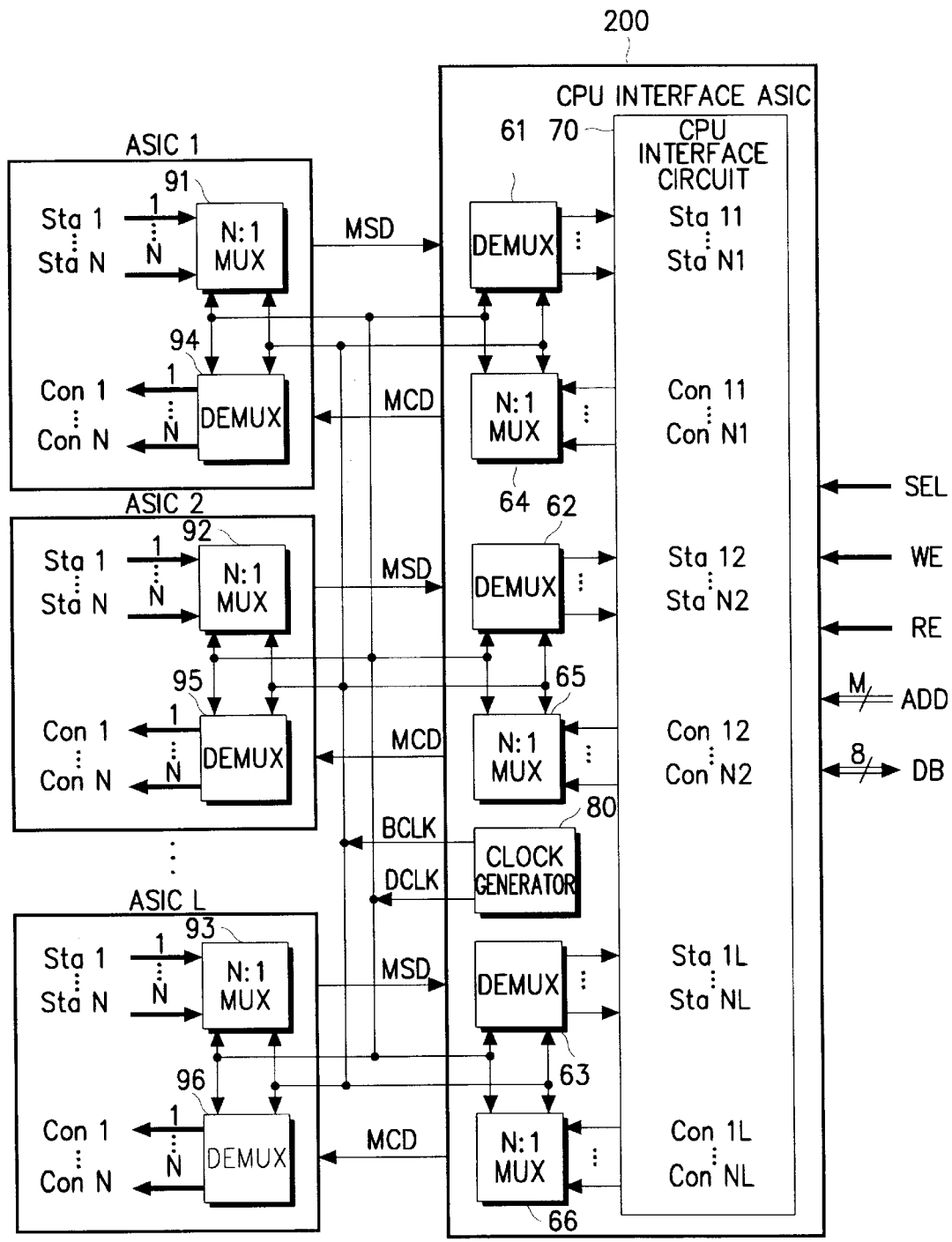
FIG. 3 is a block diagram showing the construction of a status information collection/control apparatus in accordance with an alternative embodiment of the present invention.

FIG. 3 is a block diagram showing the construction of a status information collection/control apparatus in accordance with an alternative embodiment of the present invention. As compared with the first embodiment of FIG. 2, the second embodiment is applied to the case where there are a larger number of pins. Namely, in the second embodiment, in the case where there are too many pins, they are mixed into a single signalling configuration in consideration of efficiency.

Figure 4:
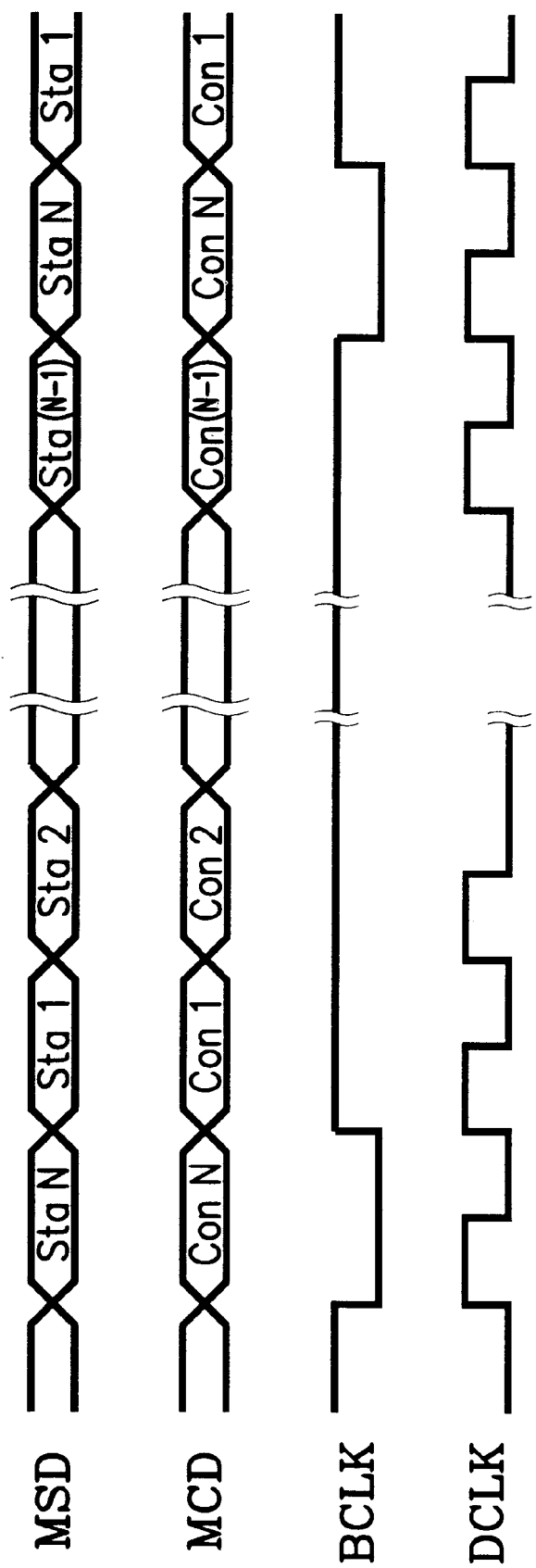
FIG. 4 is a timing diagram illustrating the operation of the status information collection/control apparatus in FIG. 3.

FIG. 4 is a timing diagram illustrating the operation of the status information collection/control apparatus in FIG. 3.

In FIG. 3, L ASICs of the same or different types may be contained in one operation processing unit. Each of the ASICs sends a plurality of (for example, N) status information units Sta 1–Sta N to a CPU (not shown), included in a monitoring control unit, and receives N control information units Con 1–Con N from the CPU. The status information units Sta 1–Sta N are the results (for example, transmission line abnormal) obtained by checking specific statuses of the corresponding ASIC. The control information units Con 1–Con N are the control contents of the CPU regarding the status information units Sta 1–Sta N. Although not shown, each of the ASICs may be connected to other internal circuits or other external boards (or units). A CPU interface ASIC 200 is a separate ASIC for handling only a CPU interface function. The CPU interface ASIC 200 includes a CPU interface circuit 70 therein. The status information from the main function ASICs are transferred to the CPU interface ASIC 200.

The CPU interface ASIC 200 further includes a clock generator 80 for generating first and second clocks DCLK and BCLK. The first clock DCLK is used as a data clock for the process of the status and control information. The second clock BCLK is produced by frequency-dividing the first clock DCLK by N. As seen from FIG. 4, the second clock BCLK has an N-bit time period of the first clock DCLK.

Each ASIC includes an N:1-multiplexer 91, 92 or 93 for multiplexing the N status information in response to the first and second clocks DCLK and BCLK to provide multiplexed status data MSD. The CPU interface ASIC 200 includes demultiplexers 61–63 each for demultiplexing the multiplexed status data MSD from a corresponding one of the N:1-multiplexers 91–93 in response to the first and second clocks DCLK and BCLK. The CPU interface ASIC 200 further includes N:1-multiplexers 64–66 each for multiplexing the N control information in response to the first and second clocks DCLK and BCLK to provide multiplexed control data MCD. Each ASIC further includes a demultiplexer 94, 95 or 96 for demultiplexing the multiplexed control data MCD from a corresponding one of the N:1-multiplexers 64–66 in response to the first and second clocks DCLK and BCLK.

The CPU interface ASIC 200 is supplied with the following signals. A unit select signal SEL is generated by the CPU to select a specific unit (or chip). An address ADD is generated by the CPU to address a memory included in the CPU interface circuit 70 in the ASIC 200. A write enable signal WE is supplied to write control data into the memory in the CPU interface circuit 70 in the ASIC 200. A read enable signal RE is supplied to read status information from the memory in the CPU interface circuit 70 in the ASIC 200. A data bus DB is a bidirectional data communication path between the CPU and the ASIC, for transferring the status information from the ASIC to the CPU and the control information from the CPU to the ASIC.

First, a status information collection operation will hereinafter be described.

In each of the ASICs, the N status information are multiplexed in response to the first and second clocks DCLK and BCLK and the resultant status data MSD is transferred to the CPU interface ASIC 200. The first and second clocks DCLK and BCLK and the multiplexed status data MSD have a timing relationship as shown in FIG. 4.

Then, in the CPU interface ASIC 200, the multiplexed status data MSD from each of the ASICs is demultiplexed in response to the first and second clocks DCLK and BCLK, thereby allowing the N status information to be recognized by the CPU interface ASIC 200. The total number of the collected status information is N×L. Then, the CPU interface ASIC 200 multiplexes the status information in response to the address ADD from the monitoring control unit and sends the multiplexed result to the monitoring control unit via the data bus DB in response to the unit select signal SEL and read enable signal RE.

Next, a control operation by the monitoring control unit will hereinafter be described.

The control information from the monitoring control unit are transferred to the CPU interface ASIC 200 via the bidirectional data bus. The CPU interface ASIC 200 separates and stores the transferred control information in response to the address ADD, unit select signal SEL and write enable signal WE. Then, in the CPU interface ASIC 200, each of the N:1-multiplexers 64–66 multiplexes the N control information in response to the first and second clocks DCLK and BCLK and transfers the resultant control data MCD to a corresponding one of the ASICs. Then, in each of the ASICs, the corresponding demultiplexer 94, 95 or 96 demultiplexes the multiplexed control data MCD from a corresponding one of the N:1-multiplexers 64–66 in response to the first and second clocks DCLK and BCLK. As a result, the N control information can be recognized by each ASIC.

As apparent from the above description, the present invention has the following advantages or effects by removing CPU interface circuits from a plurality of ASICs and using a dedicated interface ASIC.

Firstly, the gate consumption of a unit can be reduced.

Secondly, patterns in the main function ASICs can be significantly reduced in number. In the case where each ASIC is designed with an FPGA, the smaller number of signal patterns makes the routing of the FPGA easy, resulting in an improvement in performance of the ASIC.

Thirdly, the main function ASICs require a smaller number of pins, thereby reducing the cost of the ASICs.

Fourthly, separate circuits are not required. As a result, the consumption of space in the unit can be reduced and the reliability of the unit can be increased.

Furthermore, in the second embodiment, the status and control information are multiplexed and demultiplexed for the transfer thereof. Therefore, the efficient implementation is enabled although the number of pins (the number of status information: N) is increased. That is, in the case where an abnormal status occurs in the ASIC, all the status information (N) can be checked not by testing pins of the ASIC for the transfer of the status information one by one, but by testing only one pin (for the transfer of MSD).

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A status information collection/control apparatus for a communication system which has an operation processing unit including a plurality of ASICs (application specific integrated circuits)and a monitoring control unit for monitoring and controlling said operation processing unit, said apparatus comprising:

each of said ASICs including means for generating status information and process control information from said monitoring control unit regarding said status information; and a dedicated interface ASIC for performing data communication with said monitoring control unit via a bidirectional data bus and for processing an interface operation between said ASICs and said monitoring control unit in response to a unit select signal, address, read enable signal and write enable signal from said monitoring control unit.

2. The apparatus as set forth in claim 1, said dedicated interface ASIC comprising a CPU interface circuit for handling only an interface function between said ASICs and a CPU in said monitoring control unit.

3. The apparatus as set forth in claim 1, each of said ASICs comprising:
 a multiplexer for multiplexing said status information in response to a desired clock to generate multiplexed status data; and
 a demultiplexer for demultiplexing multiplexed control data inputted thereto in response to said clock.

4. The apparatus as set forth in claim 2, each of said ASICs comprising:
 a multiplexer for multiplexing said status information in response to a desired clock to generate multiplexed status data; and
 a demultiplexer for demultiplexing multiplexed control data inputted thereto in response to said clock.

5. The apparatus as set forth in claim 1, said dedicated interface ASIC comprising:
 a clock generator for generating a first clock for the process of said status and control information and frequency-dividing said first clock by the number of said information to generate a second clock;
 a demultiplexer for demultiplexing multiplexed status data in response to said first and second clocks; and
 a multiplexer for multiplexing said control information in response to said first and second clocks to generate multiplexed control data.

6. The apparatus as set forth in claim 3, said dedicated interface ASIC comprising:
 a clock generator for generating a first clock for the process of said status and control information and frequency-dividing said first clock by the number of said information to generate a second clock;
 a demultiplexer for demultiplexing multiplexed status data in response to said first and second clocks; and
 a multiplexer for multiplexing said control information in response to said first and second clocks to generate multiplexed control data.

7. The apparatus as set forth in claim 5, each of said ASICs comprising:
 a multiplexer for multiplexing said status information in response to said first and second clocks to generate said multiplexed status data; and
 a demultiplexer for demultiplexing said multiplexed control data in response to said first and second clocks.

8. The apparatus as set forth in claim 2, said bidirectional data bus comprising a data communication path between said CPU and said ASICs, for transferring said status information from said ASICs to said CPU and said control information from said CPU to said ASICs, said dedicated interface ASIC being connected to said bidirectional data bus, said dedicated interface ASIC multiplexing said status information from said ASICs in response to said address, sending the multiplexed result to said monitoring control unit via said bidirectional data bus in response to said unit select signal and read enable signal, receiving said control information from said CPU via said bidirectional data bus, separating the received control information in response to said address, unit select signal and write enable signal and transferring the separated control information respectively to said ASICs, said unit select signal being generated by said CPU to select a specific unit, said address being generated by said CPU to address a memory included in said CPU interface circuit, said write enable signal being generated to write data into said memory, and said read enable signal being generated to read the written data from said memory.

9. The apparatus as set forth in claim 4, said bidirectional data bus comprising a data communication path between said CPU and said ASICs, for transferring said status information from said ASICs to said CPU and said control information from said CPU to said ASICs, said dedicated interface ASIC being connected to said bidirectional data bus, said dedicated interface ASIC multiplexing said status information from said ASICs in response to said address, sending the multiplexed result to said monitoring control unit via said bidirectional data bus in response to said unit select signal and read enable signal, receiving said control information from said CPU via said bidirectional data bus, separating the received control information in response to said address, unit select signal and write enable signal and transferring the separated control information respectively to said ASICs, said unit select signal being generated by said CPU to select a specific unit, said address being generated by said CPU to address a memory included in said CPU interface circuit, said write enable signal being generated to write data into said memory, and said read enable signal being generated to read the written data from said memory.

10. The apparatus as set forth in claim 5, said bidirectional data bus comprising a data communication path between said CPU and said ASICs, for transferring said status information from said ASICs to said CPU and said control information from said CPU to said ASICs, said dedicated interface ASIC being connected to said bidirectional data bus, said dedicated interface ASIC multiplexing said status information from said ASICs in response to said address, sending the multiplexed result to said monitoring control unit via said bidirectional data bus in response to said unit select signal and read enable signal, receiving said control information from said CPU via said bidirectional data bus, separating the received control information in response to said address, unit select signal and write enable signal and transferring the separated control information respectively to said ASICs, said unit select signal being generated by said CPU to select a specific unit, said address being generated by said CPU to address a memory included in said CPU interface circuit, said write enable signal being generated to write data into said memory, and said read enable signal being generated to read the written data from said memory.

11. The apparatus as set forth in claim 6, said bidirectional data bus comprising a data communication path between said CPU and said ASICs, for transferring said status information from said ASICs to said CPU and said control information from said CPU to said ASICs, said dedicated interface ASIC being connected to said bidirectional data bus, said dedicated interface ASIC multiplexing said status information from said ASICs in response to said address, sending the multiplexed result to said monitoring control unit via said bidirectional data bus in response to said unit select signal and read enable signal, receiving said control information from said CPU via said bidirectional data bus, separating the received control information in response to said address, unit select signal and write enable signal and transferring the separated control information respectively to said ASICs, said unit select signal being generated by said CPU to select a specific unit, said address being generated by said CPU to address a memory included in said CPU interface circuit, said write enable signal being generated to write data into said memory, and said read enable signal being generated to read the written data from said memory.

12. A status information collection/control method for a communication system which has an operation processing unit including a plurality of ASICs (application specific integrated circuits)and a monitoring control unit for monitoring and controlling said operation processing unit, said method comprising the steps of:

each of said ASICs generating status information and process control information from said monitoring control unit regarding said status information; and performing data communication with said monitoring control unit via a bidirectional data bus and processing an interface operation between said ASICs and said monitoring control unit in response to a unit select signal, address, read enable signal and write enable signal from said monitoring control unit.

13. The method as set forth in claim 12, each of said ASICs performing the steps of:

multiplexing said status information in response to a desired clock to generate multiplexed status data; and demultiplexing multiplexed control data inputted thereto in response to said clock.

14. The method as set forth in claim 12, comprising the steps of:

generating a first clock for the process of said status and control information and frequency-dividing said first clock by the number of said information to generate a second clock;

demultiplexing multiplexed status data in response to said first and second clocks; and multiplexing said control information in response to said first and second clocks to generate multiplexed control data.

15. The method as set forth in claim 13, further comprising the steps of:

generating a first clock for the process of said status and control information and frequency-dividing said first clock by the number of said information to generate a second clock;

demultiplexing multiplexed status data in response to said first and second clocks; and multiplexing said control information in response to said first and second clocks to generate multiplexed control data.

16. The method as set forth in claim 14, further comprising the steps of:

multiplexing said status information in response to said first and second clocks to generate said multiplexed status data; and demultiplexing said multiplexed control data in response to said first and second clocks.

* * * * *